(No Model.)
J. T. HANCOCK.
Valve for Injectors.
No. 239,326.                    Patented March 29, 1881.
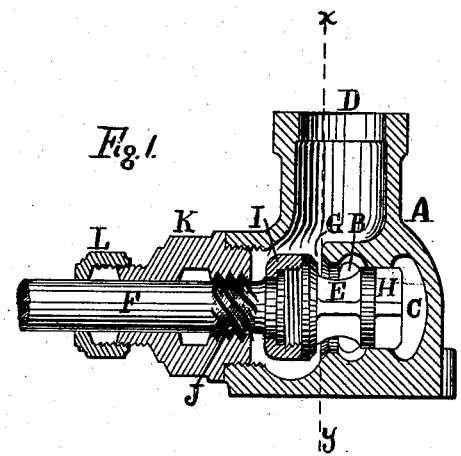
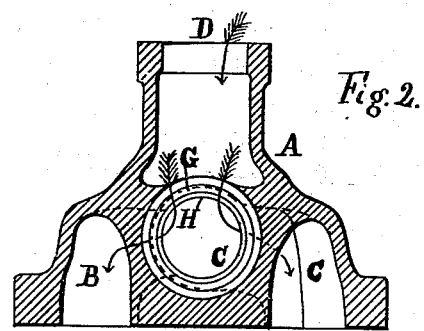
Witnesses,
Edw. S. Cobb.
J. Barrow Lord
Inventor,
John T. Hancock
by J. H. Adams
Atty.
N. PETERS, PHOTO-LITHOGRAPHER, WASHINGTON, D C.

United States Patent Office.

JOHN T. HANCOCK, OF BOSTON, MASSACHUSETTS, ASSIGNOR TO THE HANCOCK INSPIRATOR COMPANY, OF SAME PLACE.

VALVE FOR INJECTORS.

SPECIFICATION forming part of Letters Patent No. 239,326, dated March 29, 1881.

Application filed August 16, 1880. (No model.)

*To all whom it may concern:*

Be it known that I, JOHN T. HANCOCK, of Boston, in the county of Suffolk and State of Massachusetts, have invented a new and useful Improvement in Valves, of which the following is a specification.

My invention relates to an improvement in valves used in connection with apparatus for lifting and forcing fluids, and is especially adapted for application to the Hancock inspirator, for which a patent was granted January 2, 1877.

The object of the invention is to provide a means for opening two or more conduits successively for the passage of steam or other fluids by the continuous movement of a single connection or valve-stem in such a manner that one conduit shall be opened in advance of the other, by which means, as adapted to the said Hancock inspirator, the steam which enters the first steam-passage will operate the lifting apparatus, and that which afterward enters the second steam-passage will operate the forcing apparatus.

The invention consists in the combination of two or more separate valves, one being a seated and the other a piston valve, having a rigid connection with each other, the relative position of the said valves to the orifices which they open and close being such that their movement shall cause the orifices to be successively opened, for the purpose of allowing the passage of the fluid first to one or more conduits and then to the other or others.

Referring to the drawings, Figure 1 represents a longitudinal vertical section of a valve embodying my improvement. Fig. 2 is a transverse vertical section on the line *x y* of Fig. 1.

A is the head or valve-casing, composed of metal and cast in one piece. D is the steam-supply passage.

B is a steam-passage connecting with passage D and leading to the lifting apparatus.

C is the steam-passage, also connecting with passage D and leading to the forcing apparatus, the respective connections being indicated by dotted lines in Fig. 2.

G is a seated valve, opening and closing the orifice of the passage B.

H is a piston-valve, rigidly attached to the seated valve G by the connection E, and opening and closing the orifice of passage C.

F is the valve-stem connected to the valve G by means of a union-nut, I.

K is the valve-stem nut, provided with a screw-thread, in which is fitted the screw J on the valve-stem F.

L is a packing-cap, fitting up the valve-stem, and screwed upon the nut K.

Although the valves are represented as operating upon but two conduits, it is obvious that they may be arranged to control the passage of steam or liquids to any number of conduits, and opening or closing them in any required order of succession.

The operation is as follows: The valve-stem F being operated upon, the valve G will first open and admit steam from the passage D to the passage B, and thus put in operation the lifting apparatus, the valve H remaining closed, although having been moved a short distance in its bearing. As soon as the lifting apparatus is put in operation, a further motion is given to the valve-stem F, which then opens the valve H and admits steam to the passage C, thus putting in operation the forcing apparatus.

What I claim as my invention, and desire to secure by Letters Patent, is—

1. The combination of two or more separate valves, one of which is a seated valve and the other a piston-valve, rigidly attached together, substantially as described, and arranged, in relation to the orifices which they successively open or close, substantially as and for the purpose set forth.

2. The seated valve G and piston-valve H, connected together by a stem, E, in combination, respectively, with the independent and separate passages B and C, substantially as and for the purpose specified.

In testimony whereof I have signed my name to this specification in the presence of two subscribing witnesses.

JOHN T. HANCOCK.

Witnesses:
J. H. ADAMS,
EDW. S. COBB.